Aug. 2, 1955     A. HENNIG     2,714,374
FOUR STROKE CYCLE VALVE TIMING
Filed Nov. 26, 1951     2 Sheets-Sheet 2

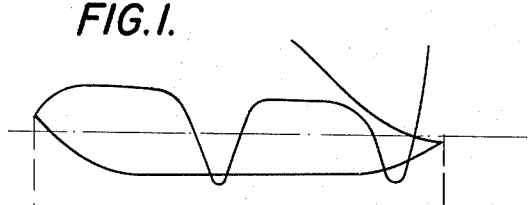
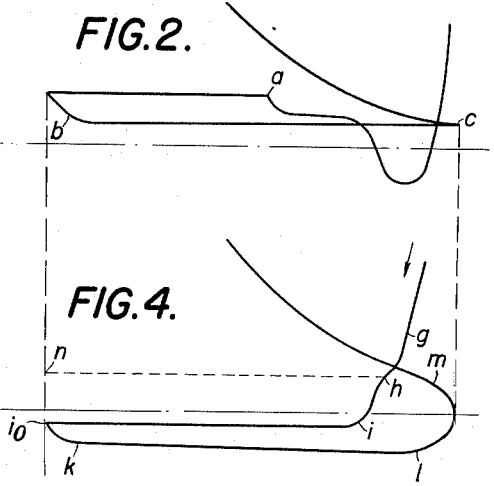
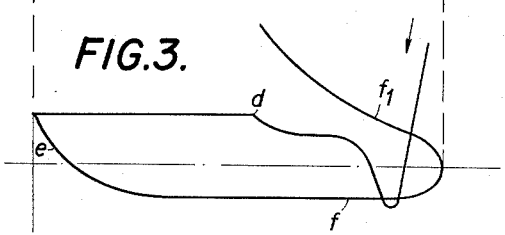
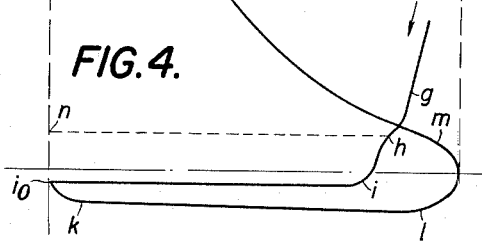
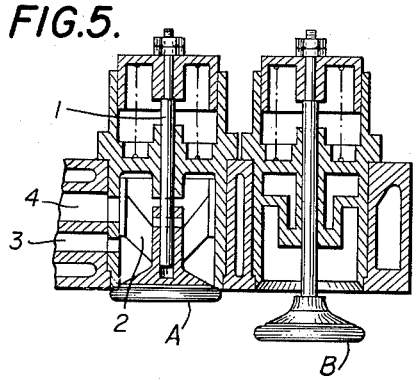
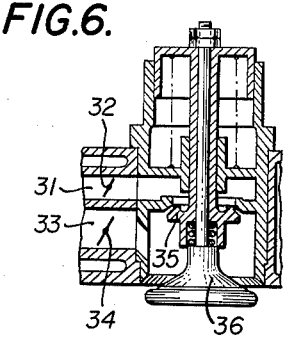
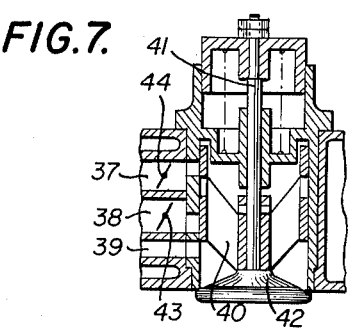
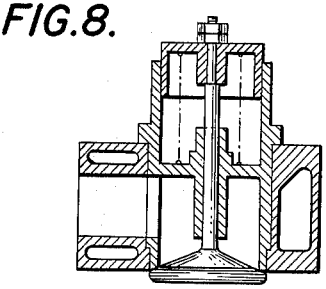

United States Patent Office 2,714,374
Patented Aug. 2, 1955

2,714,374

FOUR STROKE CYCLE VALVE TIMING

Albert Hennig, Kiel, Germany

Application November 26, 1951, Serial No. 258,139

Claims priority, application Germany June 26, 1951

8 Claims. (Cl. 123—59)

It is a well known fact that the output of a combustion engine may be increased and the consumption of fuel reduced by creating a vacuum that extends as far as into the cylinder during the exhaust stroke.

In this manner, the exhaust gases, which are so detrimental to the combustion process, may be removed by suction from the combustion chamber. If, in addition, the intake valve is opened during the period of the vacuum, the vacuum in the cylinder will cause air, respectively, a fuel-air mixture, to be drawn in which, at the upper dead center, will completely remove the exhaust gases and fill the compression chamber with pure air.

Any further desired increase in the output, without a change in the number of revolutions, can only be effected by supplying compressed charge air. However, as an increase of the pressure of the charge air simultaneously increases the latter's temperature, the weight of the charge air, that is, the output of the engine, increases at a slower rate than would be in accordance with the increase in pressure of the charge air. Furthermore, the efficiency of the engine decreases in consequence of the necessarily increased blast output.

Therefore, in the interest of a maximum output it is necessary to keep the scavenging pressure at as low a level as possible. All the same, it must be sufficient to overcome the resistance encountered in the removal of the exhaust gases, and it must exceed the maximum pressure in the working cylinder during the scavenging period.

In the drawings:

Fig. 1 is a light spring diagram for a gas engine;

Fig. 2 is a light spring diagram for a gas engine operating with a supercharger;

Fig. 3 is a light spring diagram for a gas engine with pressure scavenging means;

Fig. 4 is a light spring diagram of a gas engine operating according to the present invention;

Fig. 5 is an inlet and exhaust valve for the engine;

Fig. 6 is a modification of the inlet valve;

Fig. 7 is another modification of the inlet valve;

Fig. 8 is an inlet valve for a Diesel engine;

Figure 9:
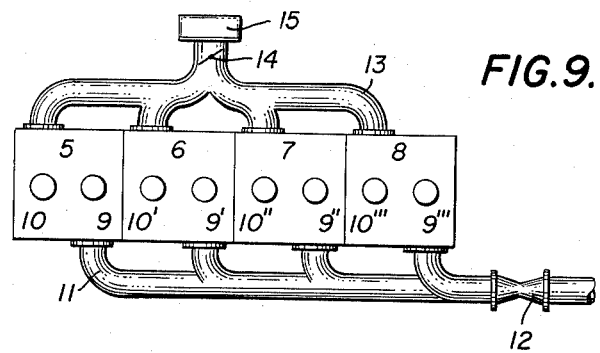
Fig. 9 is an engine with four working cylinders and the exhaust pipe and suction pipe that serves all of the cylinders.

As is shown in the light spring diagram in Fig. 1, which illustrates the distribution of pressure in a working cylinder of a gas engine during the period of exhaust and suction, the pressure fluctuates materially during the exhaust period and reaches considerable levels. These fluctuations are caused by the resistance encountered in the removal of the gases and by incalcuable oscillations of the gas in the exhaust pipe which react on the pressures in the working cylinder.

Two processes have become known in which the scavenging and the charging of an engine is done by compressed air:

1. The engine piston does not draw in air from outside, but the intake valve is connected with a blast either driven by the respective engine or by a special power engine. As the inlet valve opens, compressed air enters the cylinder.

According to the light spring diagram Fig. 2, the inlet valve opens during the exhaust stroke, for instance, at $a$. Compressed air enters the working cylinder and forces the remaining exhaust gas into the exhaust pipe. The exhaust valve closes, for instance, at $b$; the scavenging is completed. The inlet valve, remaining open, allows compressed air to enter the working cylinder during the suction stroke. At $c$, for instance, the compression begins with the force from the blast.

This process has the following disadvantages:

Large amounts of compressed air; high scavenging pressure owing to the fluctuations in the working cylinder; in consequence, increased temperature of the scavenging air, large blast output. In the case of gas engines, it is necessary to provide a second blast for the compression of the gas, which is the reason why this process is only used for diesel engines.

2. The following process is adopted for decreasing the amount of scavenging air for saving the additional blast in case of gas engines:

In Fig. 5, A is an inlet valve, B is an exhaust valve. A valve rod 1 of the inlet valve A is firmly connected with a two-way valve 2 which, for instance, regulates a compressed air passage 3 and a gas mixture passage 4. According to the light spring diagram in Fig. 3, the inlet valve opens, for instance, at $d$, and compressed air passes through the open compressed air passage 3 into the working cylinder and forces the remaining exhaust gases into the exhaust pipe. The exhaust valve closes, for instance, at $e$; the scavenging is completed. About at the same time, with the intake valve continuing open, the mixture passage 4 is opened. The working piston now draws in a gas mixture of atmospheric pressure. The inlet valve commences its final movement. For instance, at $f$, the mixture passage is closed, Fig. 3, and the compressed air passage 3 is opened. Compressed air enters the working cylinder and charges the same. At the closing of the intake valve, about at $f$, the charging is completed. The compression starts with the charging pressure. During the period of suction and charging the exhaust valve remains closed.

In this process a second blast for compressing the gas is eliminated. It is true, there is a decrease in the amount of compressed air to be conveyed, but there are still the high pressure and the high temperature. The amount of air or mixture drawn in by the working piston decreases because, owing to the great difference between scavenging and suction pressure, the line of re-expansion, at the starting of the suction stroke, intersects the line of suction very late, in Fig. 3, for instance, only at $u$, and air is only drawn in after the working piston has covered the distance from $t$ to $u$. With the output at the same level, the reduced amount of compressed air must be compensated by an increased weight of air at charging. This means an increase of the charging pressure. As the amount to be conveyed increases at the same time, the engine must increase the blast output, and the actual output decreases.

With the use of Fig. 4, it will be explained in the following how these disadvantages may be avoided.

Either by special provisions or, as in the present case, for instance, by a nozzle, or in some other manner a vacuum is created in the exhaust pipe which extends as fas as into the cylinder. Fig. 4 shows the course of pressure in the working cylinder during the exhaust stroke and the suction stroke.

The vacuum in the exhaust pipe continues until another cylinder exhausts into the same pipe; the vacuum in the cylinder ends where the exhaust valve of the same closes, i. e., for instance, at $k$.

This means that a vacuum prevails in the cylinder from $i$ to $k$. At $k$, the suction stroke starts and ends at $l$. From $l$ to $m$ the engine is charged.

In case of an ordinary engine that develops no vacuum in the exhaust pipe and in the cylinder during the exhaust stroke, it is necessary for the piston to overcome considerable pressure above atmospheric in forcing out the exhaust gases. In this respect the engine has to perform excessive work that is in proportion with the area $h$—$n$—$i_0$—$i$—$h$. The intake valve may be opened at any chosen moment of the vacuum period. Atmospheric air will then enter the cylinder; this air cools the cylinder walls and completely removes the still remaining exhaust gases.

Therefore, air of atmospheric pressure is sufficient for the removal of the exhaust gases.

If, for a further increase of the output, compressed air would be used in the place of atmospheric air, the increased gradient of the pressure would cause an unnecessarily large amount of compressed air to enter the cylinder during the vacuum period.

In order to save blast work that must be performed by the engine it is necessary, therefore, or practical, to open the intake valve only so far as to throttle the entering compressed air sufficiently to reduce it to about atmospheric pressure.

This reduced opening of the intake valve may be brought about by a respective adaptation of the cam that drives the valve in the known manner by means of a lever.

Figure 12:
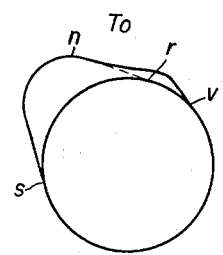
Fig. 12 is the cam for the inlet valve.

In Fig. 12, $T_0$ shows the position of the working piston at the upper dead center. In the ordinary engine, without production of a vacuum in the exhaust pipe, the intake valve opens at $r$ and closes at $s$. The engine in which a vacuum is created during the exhaust stroke has its intake valve generally opened much earlier, for instance, at $v$. From $v$ up to the upper dead center at $w$ the height of the cam is reduced in accordance with the small cross section of the intake valve.

The necessary equipment for realizing the idea of the invention, such as intake and mix valves and their drive, will be explained by examples in the following. In this respect only such arrangements are described which refer to the guidance of the gases in the intake valve itself.

*I. Increase of output with the use of compressed air*

(a) For diesel engines an ordinary cylinder head with intake valve according to Fig. 8 is used. In the diesel engine, pure air enters the working cylinder through the slightly opened intake valve during the exhaust period, filling the compression chamber with pure air after the exhaust of the exhaust gases. Ordinarily, the intake valve is fully opened during the suction period.

(b) However, if the engine does not take in pure air but a fuel-air mixture, quite a considerable portion of the latter will be carried along with the escaping exhaust gases into the exhaust pipe, causing much waste.

The invention serves to eliminate the above difficulties and consists in the exhaust gases and the fuel-air mixture not being removed simultaneously but, principally, one after the other with the valves being controlled accordingly. In the course of this the vacuum in the exhaust pipe and in the cylinder must be maintained also after the upper dead center.

In the case of an early opening of the intake valve the mixture losses are comparatively heavy. Therefore, the intake valve is only opened and the fuel mixture is only being removed from the suction pipe when the opening cross sections of the exhaust valve, that closes shortly after the upper dead center, have become so small as to allow only very small, in fact, negligible quantities of exhaust gases and mixture carried with them to get into the exhaust pipe. Mostly, the vacuum in the exhaust pipes starts before the center of the exhaust stroke; it ends when another cylinder exhausts into the same exhaust pipe.

The angle described by the crankshaft from the beginning of the exhaust of a cylinder until the beginning of the exhaust of the next following cylinder is equal to the ignition distance. If the ignition distance amounts to 180° crank angle, the vacuum period ends at the upper dead center. If the ignition distance exceeds 180°, the vacuum will end after the upper dead center.

As the ignition distance in engines with two and three cylinders exceeds 180° crank angle, a vacuum prevails in these engines also after the upper dead center.

If in engines with more than three cylinders a vacuum is to be created also after the upper dead center, it is necessary to provide two separate exhaust pipes. In addition, the exhaust gases of succeeding cylinders may not be led into the same but must be led into the other separate exhaust pipe.

The enclosed drawings show an example of how the invention may be applied.

In Fig. 9 Nos. 5, 6, 7, 8, designate working cylinders, 9, 9', 9'', 9''', designate exhaust valves, 10, 10', 10'', 10''', designate intake valves; No. 11 designates the exhaust pipe for all cylinders; No. 12 designates the device with the use of which a vacuum is created in the exhaust valve; No. 13 designates the intake manifold, No. 14 designates the throttle valve of the carburettor, and No. 15 the carburettor.

The valves are operated in the known manner by levers driven by cams arranged on a camshaft that serves for all cylinders. In this engine the ignition distance is 180°, which means, that the vacuum in the exhaust pipe ends in the upper dead center.

Figure 10:
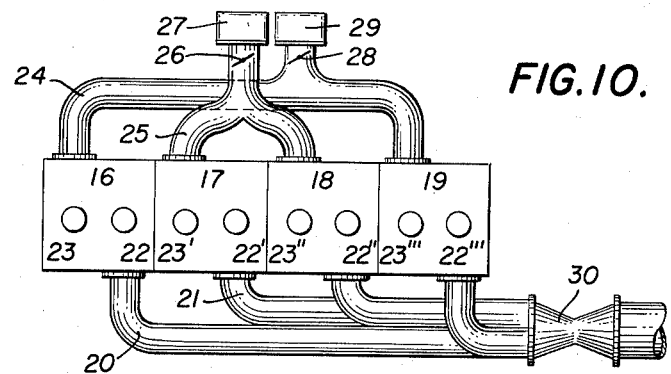
Fig. 10 is an engine with four working cylinders and two suction pipes.
Figure 11:
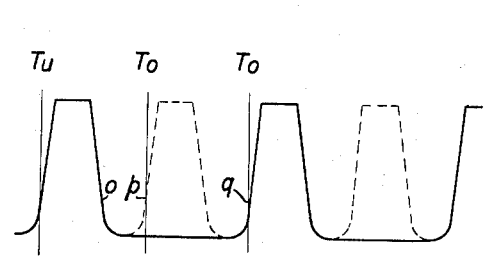
Fig. 11 is a diagram of the pressure changes in the exhaust pipe.

In Fig. 10 Nos. 16, 17, 18, 19, designate the working cylinders, Nos. 20 and 21, the two separate exhaust pipes, Nos. 22, 22', 22'', 22''', refer to the exhaust valves; Nos. 23, 23', 23'', 23''', designate the intake valves, and No. 30 designates the device for creating the vacuum. In Fig. 10, for instance, the exhaust gases of cylinder 16 are guided into the exhaust pipe 20; the then exhausting cylinder 18 sends its exhaust gases into the separate pipe 21; the exhaust gases of cylinder 19 go into pipe 20, and those of the cylinder 17 are removed to pipe 21. Accordingly, another cylinder will exhaust into the same pipe as a previous cylinder only after 360° revolution of the crankshaft. Fig. 11 shows the respective diagram with the basic line O; $T_6$ shows the position when the piston is in the upper dead center, and $T_u$ shows the position when the piston is in the lower dead center. At O the vacuum starts; it ends at $p$ after 180° revolution of the crankshaft, that is, in the case of the dotted line in which case only a single exhaust pipe is presumed (Fig. 9) while the solid line shows the case according to Fig. 10 and demonstrates that the initial position is only reached once more at 360° at $q$. The curve $o$ to $q$, therefore, shows that the vacuum in the exhaust pipe will continue until the end of the suction period and after the upper dead center. In engines with six cylinders and two exhaust pipes the ignition distance amounts to 240° crank angle. Accordingly, the vacuum will prevail up to 60° after the upper dead center.

In a four stroke engine with four working cylinders and more the pressure in the space before the intake valve is decreased in such a manner that during the suction by the vacuum of one cylinder, the piston of another cylinder, at the same time, draws in, from the same suction pipe, a mixture thus decreasing the pressure in the suction pipe and in the space before the inlet valve, and reducing the weight of the drawn-in mixture.

Fig. 10 shows how this disadvantage may be avoided.

Two suction pipes have been provided; a suction pipe No. 24 with a carburettor No. 29 and a throttle valve No. 28; a suction pipe No. 25 with a carburettor No. 27 and a throttle valve No. 26. The suction pipes are connected with the intake valve spaces in such a manner that the suction of mixture by the vacuum in the one cylinder does not result from one and the same but from several suction pipes.

(c) The following arrangement may be used for gas engines and petrol engines:

In Fig. 6 No. 31 is a gas passage, No. 32 a gas throttle, No. 33 an air passage, No. 34 an air throttle, No. 35 a gas valve, firmly connected with valve rod No. 36. The gas valve is provided with a cover so that only pure air enters the cylinder if, during the exhaust period, the intake valve opens but little; during the suction period, air passage 33 and gas valve 35 are both open at the same time; amount and the ratio of the mixture of both gases are adjusted by the engine governor by means of the air throttle 34 and gas throttle 32.

*II. Increase of output by removal of the exhaust gases and recharging by means of compressed air*

(a) For diesel engines the ordinary cylinder head with intake valve according to Fig. 8 may be used. The intake valve is not fed with atmospheric air but with low pressure compressed air. During the exhaust period the intake valve is opened so little that the pressure of the compressed air that enters the cylinder is reduced to about 1 atm. abs. so that the pressure conditions in the working cylinder are the same as in the case of air of atmospheric pressure. Toward the end of the suction stroke the intake valve is opened fully. Compressed air, not throttled, enters the working cylinder and charges the same. This method may also be applied to carburettor engines if the carburettor device is fed with compressed air instead of with atmospheric air.

(b) For gas engines in which a centrally controlled mixture is fed to the separate working cylinders, the following arrangement is suitable: If the intake valve, Fig. 5, the details of which were explained in the foregoing, opens but little during the exhaust period, strongly throttled compressed air passes through the two-way valve (2) into the working cylinder. The air fills the compression chamber in which a vacuum has been created either by the effect of the nozzle or by some other means. Upon a further opening of the intake valve the compressed air passage (3) will be closed by the two-way valve (2) while the mixture passage (4) is opened so that, during the suction stroke, a gas mixture enters the working cylinder. Toward the end of the suction stroke the gas passage (4) is closed and the compressed air passage (3) is opened. Now the charging period commences. The driving cam is developed in such a manner that the compressed air passage will close only after the compression period has started.

(c) Method for gas engines with control of each working cylinder.

In Fig. 7 No. 37 is a gas passage, No. 38 a passage for the atmospheric air, No. 39 a compressed air passage, No. 40 a two-way valve controlling these passages and connected firmly with spindle No. 41 of valve head No. 42. If the intake valve opens quickly, the two-way valve will first close compressed air passage No. 39 and, shortly after, the passage for atmospheric air 38 will be slightly opened. The two-way valve will remain in this position during the entire exhaust period; atmospheric air enters the working cylinder and fills the compression chamber. Upon the start of the suction period the two-way valve will also open the gas passage 37. Quantity and the ratio of mixing of the two gases will then be adjusted with the aid of the engine governor by means of the throttle elements 43 and 44. Toward the end of the suction stroke the gas passage and the passage of the atmospheric air 38 will be closed, whilst the compressed air passage 39 will be opened and will remain open during the first part of the compression stroke.

The above description of examples of the invention follows the conventional methods of construction. However, they are distinguished from the latter by certain features of the invention such as period and duration of the opening and the closing of the passages, the size of the opening, the manner of drive adapted to the special purpose aimed at, and others. Examples have been cited in which the elements for the control of the individual gas passages are arranged inside the intake valve. The said arrangements apply in sense also to arrangements in which the control of the passages is effected outside the intake valve.

The invention may be used for four-stroke and two-stroke engines.

I claim:

1. In a multicylinder combustion engine, each of the cylinders having an intake valve, an exhaust pipe connected to a plurality of cylinders, means for producing a vacuum in the exhaust pipe during the exhaust stroke and a pressure gradient between the exhaust pipe and the intake valve, and a cam for operating the intake valve, said cam having a low level to provide a partial valve opening from a selected point in the exhaust stroke during said production of a vacuum until after the piston has passed upper dead center and a higher level to provide full opening of the intake valve during the last portion of the suction stroke.

2. In a multicylinder combustion engine, each of the cylinders having an exhaust valve and an intake valve, a plurality of exhaust pipes each connected to a plurality of cylinders in the manner that successively exhausting cylinders are connected to different pipes, means for producing a vacuum in each of said pipes during the exhaust strokes in the respective cylinders, means for opening the intake valve of each cylinder a limited amount only during said production of a vacuum on the exhaust stroke and an initial portion of the suction stroke and for opening the intake valve a greater amount during a subsequent portion of the suction stroke.

3. In a multicylinder internal combustion engine, each of the cylinders having an intake and an intake valve, a common exhaust pipe connected to a plurality of cylinders, means for producing a vacuum in the exhaust pipe during the exhaust stroke and a pressure gradient between the exhaust pipe and the intake, means for partially opening said intake valve from a selected point in the exhaust stroke during the production of said vacuum until after the piston in said cylinder has passed upper dead center and for fully opening the intake valve during the last portion of the suction stroke, means for supplying air through said partially opened valve into the cylinder at approximately atmospheric pressure and feeding compressed air through the fully opened intake valve at the end of the suction stroke.

4. In a multicylinder internal combustion engine, each of the cylinders having an intake and an intake valve, a common exhaust pipe connected to a plurality of cylinders, means for producing a vacuum in the exhaust pipe during the exhaust stroke and a pressure gradient between the exhaust pipe and the intake, means for supplying compressed air to said intake and means for partially opening said intake valve from a selected point in the exhaust stroke during the production of said vacuum until after the piston in said cylinder has passed upper dead center, to admit air into the cylinder, said air being throttled to reduce its pressure approximately atmospheric, and for fully opening the intake valve during the last portion of the suction stroke to admit unthrottled compressed air into the cylinder.

5. In a multicylinder internal combustion engine, each of the cylinders having an intake and an intake valve, a common exhaust pipe connected to a plurality of cylinders, means for producing a vacuum in the exhaust pipe and a pressure gradient between the exhaust pipe and the intake during the exhaust stroke, means for partially opening said intake valve from a selected point in the exhaust stroke during the production of said vacuum until after the piston in said cylinder has passed upper dead center and for fully opening said intake valve during the last portion of the suction stroke and means for supplying compressed air to the intake during the exhaust stroke, the opening of said intake valve being restricted to throttle said air to approximately atmospheric pressure, for supplying air at atmospheric pressure to said cylinder during the suction stroke and for supplying unthrottled compressed air to said cylinder through said fully open intake valve toward the end of the suction stroke.

6. In a multicylinder internal combustion engine, each of the cylinders having an intake and an intake valve, a common exhaust pipe connected to a plurality of cylinders, means for producing a vacuum in the exhaust pipe and a pressure gradient between the exhaust pipe and the intake during the exhaust stroke, means for partially opening said intake valve from a selected point in the exhaust stroke during the production of said vacuum until after the piston in said cylinder has passed upper dead center and for fully opening said intake valve during the last portion of the suction stroke and means for supplying compressed air to the intake during the exhaust stroke, the opening of said partially open intake valve being restricted to throttle said air to approximately atmospheric pressure, for supplying a fuel-air mixture to said intake at approximately atmospheric pressure during the suction stroke and for supplying unthrottled compressed air to said cylinder through said fully opened intake valve toward the end of the suction stroke.

7. In a multicylinder internal combustion engine, each of the cylinders having an intake and an intake valve, a common exhaust pipe connected to a plurality of cylinders, means for producing a vacuum in the exhaust pipe and a pressure gradient between the exhaust pipe and the intake during the exhaust stroke, means for partially opening said intake valve from a selected point in the exhaust stroke during the production of said vacuum until after the piston in said cylinder has passed upper dead center and for fully opening said intake valve during the last portion of the suction stroke and means for supplying a fuel-air mixture under pressure to said intake during the exhaust stroke and during most of the suction stroke, the opening of said intake valve being restricted to throttle said mixture to approximately atmospheric pressure, and supplying unthrottled compressed air to said cylinder through said fully opened intake valve toward the end of the suction stroke.

8. In a multicylinder internal combustion engine, each of the cylinders having an intake and an intake valve, a common exhaust pipe connected to a plurality of cylinders, means for producing a vacuum in the exhaust pipe and a pressure gradient between the exhaust pipe and the intake during the exhaust stroke, means for partially opening said intake valve from a selected point in the exhaust stroke during the production of said vacuum until after the piston in said cylinder has passed upper dead center and for fully opening said intake valve during the last portion of the suction stroke and means for supplying air at approximately atmospheric pressure through said partially opened intake valve during the exhaust stroke, supplying fuel-air mixture at approximately atmospheric pressure to the cylinder during a major portion of the suction stroke and supplying unthrottled compressed air to said cylinder through said fully opened exhaust valve during an end portion of the suction stroke.

References Cited in the file of this patent

UNITED STATES PATENTS

| | | |
|---|---|---|
| 1,896,163 | Champion, Jr. | Feb. 7, 1933 |
| 1,927,368 | Kjaer | Sept. 19, 1933 |
| 2,102,559 | Kadenacy | Dec. 14, 1937 |
| 2,306,580 | Wilson | Dec. 29, 1942 |
| 2,644,436 | Berlyn | July 7, 1953 |
| 2,649,083 | Vogel et al. | Aug. 18, 1953 |

FOREIGN PATENTS

| | | |
|---|---|---|
| 30,475 | Great Britain | Dec. 30, 1909 |